United States Patent
Maybee et al.

(10) Patent No.: US 9,772,949 B2
(45) Date of Patent: Sep. 26, 2017

(54) APPARATUS, SYSTEM AND METHOD FOR PROVIDING A PERSISTENT LEVEL-TWO CACHE

(71) Applicant: Oracle International Corporation, Redwood City, CA (US)

(72) Inventors: Mark Maybee, Boulder, CO (US); Mark J. Musante, Westford, MA (US); Victor Latushkin, Superior, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 68 days.

(21) Appl. No.: 13/655,195

(22) Filed: Oct. 18, 2012

(65) Prior Publication Data

US 2014/0115244 A1 Apr. 24, 2014

(51) Int. Cl.
*G06F 12/00* (2006.01)
*G06F 12/0897* (2016.01)

(52) U.S. Cl.
CPC .... *G06F 12/0897* (2013.01); *G06F 2212/225* (2013.01); *G06F 2212/6046* (2013.01)

(58) Field of Classification Search
CPC ......... G06F 2212/6046; G06F 12/0897; G06F 2212/225; G06F 12/08
See application file for complete search history.

(56) References Cited

U.S. PATENT DOCUMENTS

| | | | |
|---|---|---|---|
| 7,130,957 B2 * | 10/2006 | Rao | ................................. 711/3 |
| 7,676,633 B1 * | 3/2010 | Fair | .................... G06F 12/0897 |
| | | | 711/122 |
| 7,698,506 B1 * | 4/2010 | Fair et al. | ...................... 711/133 |
| 2005/0015374 A1 * | 1/2005 | Reinauer | ............. G06F 12/0868 |
| 2005/0080995 A1 * | 4/2005 | Davis et al. | ................... 711/133 |
| 2005/0083759 A1 * | 4/2005 | Wong | ................... G06F 12/0246 |
| | | | 365/222 |
| 2009/0150599 A1 * | 6/2009 | Bennett | ......................... 711/103 |
| 2009/0307249 A1 * | 12/2009 | Koifman | ................ G06F 3/0623 |
| 2010/0250833 A1 * | 9/2010 | Trika | .............................. 711/103 |
| 2011/0022801 A1 * | 1/2011 | Flynn | .......................... G06F 9/52 |
| | | | 711/120 |
| 2011/0191522 A1 * | 8/2011 | Condict et al. | ............... 711/103 |
| 2011/0276781 A1 * | 11/2011 | Sengupta | ............ G06F 12/0862 |
| | | | 711/216 |

OTHER PUBLICATIONS

Leventhal, A. Flash storage memory. Commun. ACM 51, 7 (2008), 47-51.*

J. Moellenkamp, Some insight into the read cache of ZFS—or: The ARC, c0t0d0s0.org , Feb. 20, 2009.*

(Continued)

*Primary Examiner* — David X Yi
*Assistant Examiner* — Francisco Grullon
(74) *Attorney, Agent, or Firm* — Kilpatrick Townsend & Stockton LLP

(57) ABSTRACT

Aspects of the present disclosure involve a level two persistent cache. In various aspects, a solid-state drive is employed as a level-two cache to expand the capacity of existing caches. In particular, any data that is scheduled to be evicted or otherwise removed from a level-one cache is stored in the level-two cache with corresponding metadata in a manner that is quickly retrievable.

15 Claims, 7 Drawing Sheets

(56) References Cited

OTHER PUBLICATIONS

B.Gregg, ZFS L2ARC, Oracle Blogs Jul. 22, 2008.*
Moellenkamp, Joerg, "Some insight into the read cache of ZFS—or:The ARC", published Feb. 20, 2009 , http://c0t0d0s0.org/archives/5329-Some-insight-into-the-read-cache-of-ZFS-or-The-ARC.html , 8 pages.
Leventhal, Adam "Flash Storage Memory", Communications of the ACM, Jul. 2008, vol. 51, No. 7, 5 pages.

* cited by examiner

200

| | KEY FIELD | DATA FIELD | |
|---|---|---|---|
| 1 | 36 | CEL A | — 204 |
| 2 | 44 | CEL B | — 206 |
| 3 | 57 | ... | |
| 4 | 67 | ... | |
| 5 | 72 | ... | |

200 { rows 1–5 }

FIG. 2A

|   | KEY FIELD | DATA FIELD |
|---|---|---|
| 1 | 36 | CEL A |
| 2 | 44 | CEL B |
| 3 | 57 | CEL C<br>L2 – CEL1 |
| 4 | 67 | CEL D<br>L2 – CEL2 |
| 5 | 72 | CEL E<br>00#E2 |

200 { rows 1–5 }

208 — CEL C
210 — L2 – CEL1
212 — CEL D
214 — L2 – CEL2
216 — (CEL E 00#E2)

FIG. 2B

APPARATUS, SYSTEM AND METHOD FOR PROVIDING A PERSISTENT LEVEL-TWO CACHE

TECHNICAL FIELD

Aspects of the present disclosure relate to computing systems, and in particular, systems and methods for managing memory.

BACKGROUND

In an attempt to mitigate the impact of the growing gap between CPU performance and storage performance, many computer architectures implement hierarchical memory structures that place one or more higher speed memory caches between the CPU and the slower, disc storage or other from of storage. Generally speaking, memory caches are designed to contain copies of data that is also contained in slower disc storage. However, since cache memory is typically more expensive than disc storage, cache memories are typically limited in size. As such, various caching schemes are used to store frequently used data, or recently used data, or some other subset of all data. To manage the cache after it has become full, existing data is evicted when new data arrives. Caches can only improve performance if data blocks which have already been loaded in the cache are reused before being replaced. Thus, the management of cache capacity and data use is critical.

It is with these concepts in mind, among others, that aspects of the present disclosure were conceived.

SUMMARY

One aspect of the present disclosure involves a system for managing cache. The system includes at least one processor to add at least one data chunk comprising a plurality of data blocks to a level-two cache of a file system. Each data block of the plurality of data blocks added may be identified as being evictable from a level-one cache of the file system. The processor is further configured to, subsequent to a loss of data in the level-one cache, analyze the at least one data chunk in the level-two cache to repopulate a cache list corresponding to the level-one cache. The cache list identifies the contents of the level-two cache.

Aspects of the present disclosure include methods for maintaining a cache. The method includes adding at least one data chunk comprising a plurality of data blocks to a level-two cache of a file system. Each data block of the plurality of data blocks may be identified as being evictable from a level-one cache of the file system. The method further includes: subsequent to a loss of data in the level-one cache, analyzing the at least one data chunk in the level-two cache to repopulate a cache list corresponding to the level-one cache. The cache list identifies the contents of the level-two cache.

Aspects of the present disclosure include a non-transitory computer readable medium encoded with instructions for maintaining a cache executable by a processor. The instructions include adding at least one data chunk comprising a plurality of data blocks to a level-two cache of a file system. Each data block of the plurality of data blocks is identified as being evictable from a level-one cache of the file system. The instructions further include, subsequent to a loss of data in the level-one cache, analyzing the at least one data chunk in the level-two cache to repopulate a cache list corresponding to the level-one cache. The cache list identifies the contents of the level-two cache.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

FIG. 2A-2B are block diagrams illustrating a hash table in accordance with one aspect of the present disclosure.

DETAILED DESCRIPTION

Figure 1:
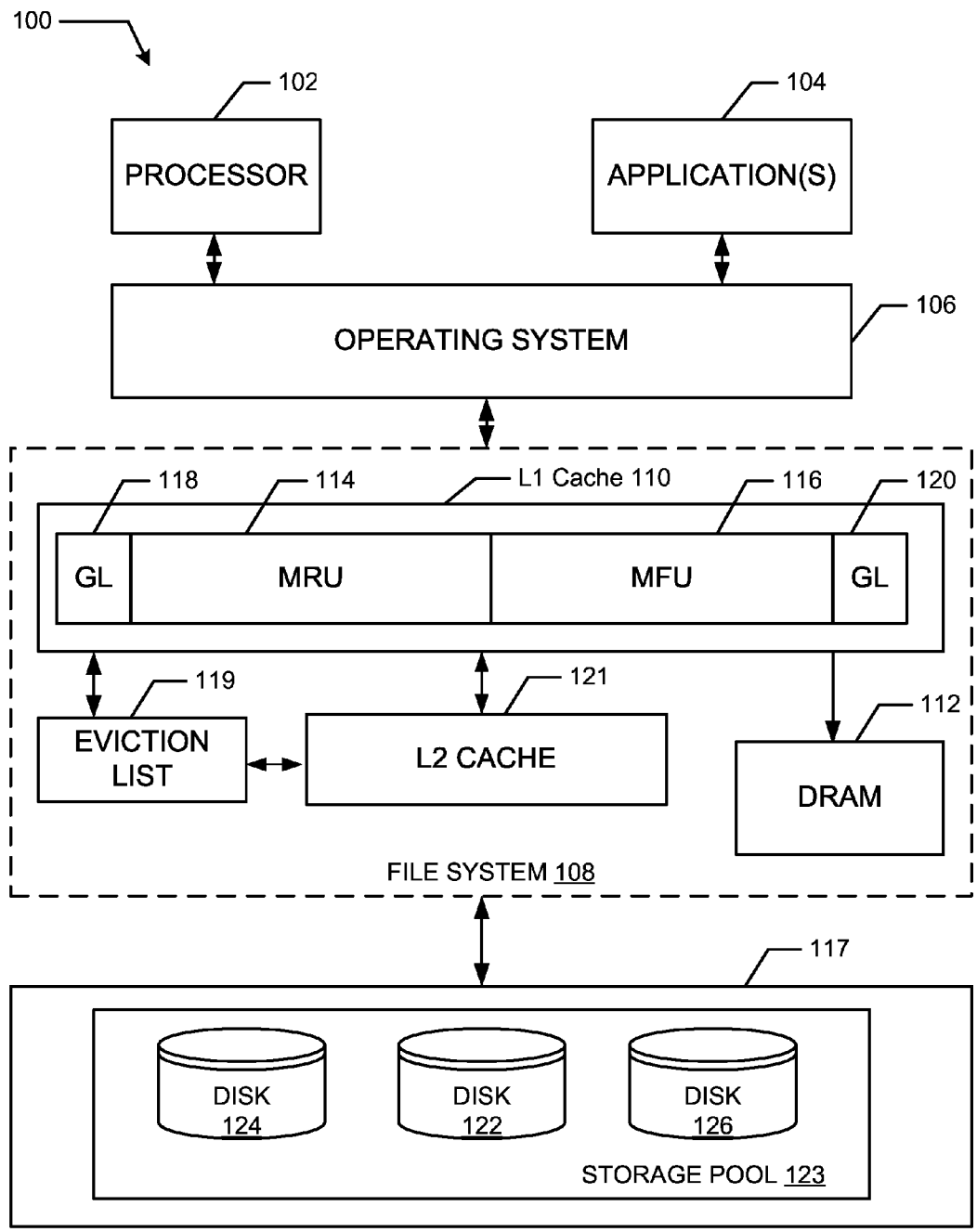
FIG. 1 is an example computing environment for managing a cache in accordance with one aspect of the present disclosure.

Aspects of the present disclosure describe systems and methods for providing a cache hierarchy consisting of a level-two ("L2") persistent cache, in addition to a level one ("L1") cache that provides caching functions for a storage pool involving one or more hard disc drives or other forms of storage. In various aspects, a solid-state drive ("SSD") may be employed as a L2 cache to expand the capacity of a conventional cache system that only employs a L1 cache. In particular, any data that is scheduled to be evicted or otherwise removed from a L1 cache may be stored in the L2 cache with corresponding metadata in a manner that is quickly retrievable. For example, the L2 cache may store data that is not requested frequently enough to justify maintaining the data in the L1 cache, but is accessed enough that maintaining a copy of the data in the L2 cache may be beneficial to overall cache performance.

The data stored and/or written in the L2 cache may be stored and/or written in a manner such that the data is discoverable in the event of a restart, reboot, failure, etc., of the L1 cache, or the importation of a new storage pool (the discovery of a pool on a storage device and make it available for use to applications). Thus, the L2 cache may be a non-volatile memory type, such SSD, whereas the L1 cache may be a volatile memory type, such as direct random access memory (DRAM). In this way, data retained in the L2 cache may be used to rebuild portions of the L1 cache in the event of a memory loss at the L1 cache. In particular, data may be stored in the L2 cache in the form of one or more data chunks that may be analyzed and used to repopulate portions of the L1 cache after a reboot or failure of L1 cache, or when a new storage pool is imported. More specifically and in one particular implementation, the L2 cache may be analyzed to rebuild references stored at the L1 cache level that identifies the contents and data stored within the L2 cache, and therefore, a read command, for example, attempting to access data that remains in the L2 cache will read the data from the L2 cache as opposed to reading the data from storage.

A cache represents a mechanism used within various computing devices and/or resources to reduce the average wait time to access memory, disk storage, etc. In particular, the cache represents a smaller, faster memory capable of storing copies of data from frequently used or otherwise important main memory locations so that future requests for the data stored in the cache can be accessed faster. There are various schemes for managing the cache, including most recently used (MRU), least recently used (LRU), and numerous others. Regardless, a cache may be used to increase the speed at which data may be accessed by reducing the number of instances in which slower main disk storage or main memory is accessed.

Generally, a cache is made up of a pool of entries. An "entry" includes a specific piece of data and a reference or tag that identifies the data. The data is stored in the cache memory and a reference identifying the data is maintained in an ordered list, which may be used to quickly access data stored within the cache. The L1 cache maintains knowledge of the data stored in the L1 cache itself, as well as the data stored in the L2 cache. Additionally, the L1 cache may be implemented with volatile memory, such as dynamic random access memory, due to high access speeds. Volatile memory represents a type of computer memory that requires power to maintain the stored information. As long as power is provided, data within the memory may be accessed; however, if the power supply is interrupted or otherwise not provided, the stored memory will be lost. Thus, the use of volatile memory for the L1 cache provides the intended function of relatively higher speed access with the downside that all of the data stored in volatile memory will be lost with the loss of power from a system failure, shutdown, reboot, or other event. Since the L1 cache maintains knowledge of the L2 contents, such knowledge is also lost if there is a loss of power.

Accordingly, the management of data blocks within an L2 cache may significantly improve cache capacity and effectiveness. In particular, while a particular block of data may not be accessed and/or requested frequently enough to be perpetually stored in an L1 cache, the data may be accessed enough that it should be maintained in a secondary, L2 cache. By maintaining such data in an L2 cache, the data may be accessed faster than if the data were only maintained in a main disk storage, resulting in an increase in performance. Moreover, the data may be maintained in the L2 cache in a manner that allows for the data to be rediscovered in the event of a failure of the L1 cache.

FIG. 1 illustrates an example computing architecture 100 for providing a persistent L2 cache. The computing environment 100 may include at least one processor 102, which may be capable of processing various instructions of a computer program, such as application(s) 104, by performing basic arithmetic, logical, and/or input/output operations, etc. The processor 102 may be included in various devices such as a personal computer, work station, server, mobile device, mobile phone, tablet device, processor, and/or other processing device capable of implementing and/or executing instructions, processes, software, applications, etc.

The processor 102 may interface with an operating system 106, which may include functionality to interact with a file system 108. For example, the operating system 106 may interface with the file system 108 via a system call interface (not shown). The operating system 106 may provide operations for users to access files within the file system 108, such as read, write, open, close, etc. The file system 108 may be an object-based file system in which both data and metadata are stored as objects within the file system. In particular, the file system 108 may include functionality to store both data and corresponding metadata in a storage device, such as disk 122. Accordingly, the various operations provided by the operating system 106 correspond to operations on objects. For example, a request to perform a particular operation (i.e., a transaction) is forwarded from the operating system 106, using the system call interface, to the file system 108. In response, the file system 108 may translate the request to perform an operation on an object directly into a request to perform a read or write operation (i.e., an I/O request) at a physical location within the disk 122, or any of the physical storage devices and/or resources 122, 124, 126 in the storage pool 123 located in a storage area 121.

In one particular embodiment, the file system 108 may be a ZFS file system. ZFS represents a combined file system and logical volume manager designed by Oracle®. The features of ZFS include data integrity verification against data corruption modes, support for high storage capacities, integration of the concepts of file system and volume management, snapshots and copy-on-write clones, continuous integrity checking and automatic repair, RAID-Z and native NFSv4 ACLs, and the like. ZFS stores and/or otherwise organizes data into objects known as data "blocks."

The file system 108 may interface or otherwise include an L1 cache 110 capable of storing one or more data objects (e.g. blocks) for frequent and fast data access. The L1 cache 110 may be any type of cache and may use various forms of relatively fast memory. In one particular embodiment, the cache may be an Adaptive Replacement Cache ("ARC") implemented in and/or in conjunction with dynamic random access memory ("DRAM") 112. DRAM 112 may be any type or format and size of dynamic random access memory.

In an ARC implementation, the entries entered into the L1 cache 110 may be maintained or managed in an ordered cache list (not shown) and sorted based on the time of most recent access. Accordingly, new entries into the L1 cache 110 are added at the top of the cache list, after the last entry on the list has been evicted. The new entry added at the top of the list pushes all of the other entries down. Each slot in the ordered cache list identifies specific physical data stored in DRAM 112. For example, each slot in the ordered cache list may be a reference pointing to a specific address and/or location in the DRAM 112.

The ordered cache list of the L1 cache 110 may be a limited size and may be divided into two variable lists, such as a "Most Recently Used" ("MRU") list 114 and a "Most Frequently Used" ("MFU") list 116, in one example. Thus, the MRU 114 and MFU 116 combined constitute a listing of all the data stored in the L1 cache, and each list (MRU and MFU) may be dynamically adjustable in size such that each list may increase or decrease in relation to the size of the other list. For example, assume the size of the L1 cache 110 was fixed at 64 KB, the MFU being 32 KB and the MRU being 32 KB. If the size of the MRU increased 12 KB to 44 KB, the MFU would be decreased proportionally in relation to the MRU, or by 12 KB to 20 KB—the fixed size of the overall L1 cache 110 would not change.

The MRU 114 contains the new entries added into the cache and behaves like the ordered list described above. Accordingly, any entry added to the MRU 114 is added at the top of the list, after the last entry of the MRU 114 has been evicted, if the MRU is full. The MFU 116 contains resource entries added to the cache that have already been requested and/or accessed at least one time before the current entry, or entries that are requested/accessed frequently. For example, assume the MFU 116 contained a reference "36" pointing to data block "A". If another request for data block "A" was transmitted from the operating system 106 to the L1 cache 110 of the file system 108, the L1 cache 110 would remove reference "36" from the MRU 114 and add it to the MFU 116. The MFU 116, like the MRU 114, behaves like an ordered cache list described above. Thus, referring to the example above, when reference "36" is added to the MFU 116, the last entry of the MFU 116 is evicted if the MFU is full. Entries entered into the MFU 116 may stay there continuously as long they are referenced again before being evicted. Thus, in the example above, reference "36" would stay in the MFU as long as reference "36" was referenced again before being evicted. If reference "36" were referenced again, it would be added to the top or beginning of the MFU list.

Both the MRU 114 and the MFU 116 may be extended with ghost lists, ("GL") (118 and 120), which are attached to the logical end of the MRU 114 and the MFU 116 respectively. The GLs are used to keep track of recently evicted cache entries from the MRU 114 and the MFU 116 lists. Thus, the MRU GL 118 tracks or records the evicted entries from the MRU 114 and MFU GL 120 tracks or records the cache entries evicted from the MFU 116. The GLs only include metadata corresponding to entries in the MRU and/or MFU and not the data itself. Rather, cache hits in the GLs 118 and 120 may be used to adapt to recent changes in the MRU 114 and/or MFU 116 usage loads. In particular, if entries are continuously being added to the MRU GL 118, it may be an indication that the size of the MRU 114 is too small and should be increased, effectively decreasing the size of the MFU 116. Alternatively, if the MFU GL 120 is continuously receiving additional entries, it may be an indication that the size of the MFU 116 is too small and should be increased, effectively decreasing the size of the MRU 114. In the way described, hits in the ghost lists may be used to dynamically adjust the size of the MRU or the MFU up to some maximum size that is constrained by the overall size of the L1 cache.

The evicted entries from the L1 cache 110 may also be tracked in an eviction list 119 that may behave like an ordered list. Specifically, when it is determined that a data block is no longer required in the L1 cache 110, the data block is referenced in the eviction list 119 for eviction. For example, the ZFS file system may execute a thread or process that determines whether a particular block of data stored in L1 cache 110 should be evicted, and if so, includes a reference to the block of data in the eviction list 119. Thus, the eviction list contains data currently stored in the L1 cache 110 that may be a candidate for eviction.

The processor 102 and/or the file system 108 may implement a hash table to identify and find actual data in the L1 cache 110 and/or an L2 cache 121 (the L2 cache will be described in detail below) based on the various entries added to the MRU 114 and/or the MFU 116 and the GLs 118 and 120. Stated differently, the hash entries identify where an actual copy of a specific block of data may be stored in the L1 or L2 cache. A hash table is a type of data structure that uses a hash function to map identifying values, known as keys, to their associated values. Typically, a hash table is implemented as an array. Thus, the hash function is used to transform the key into the index (the hash) of an array element (the slot or bucket) where the corresponding value is to be sought. In the context of the L1 cache, the hash table includes values which identify or point to a particular location within the MRU 114 and/or MFU 116, the eviction list, and the like. At that particular location, a reference that identifies actual data stored in DRAM 112 and/or the L2 cache 121 is maintained. Alternatively, the hash entry may identify a specific location in the GLs 118 or 120 that identifying a recently evicted cache entry.

Figure 2A:
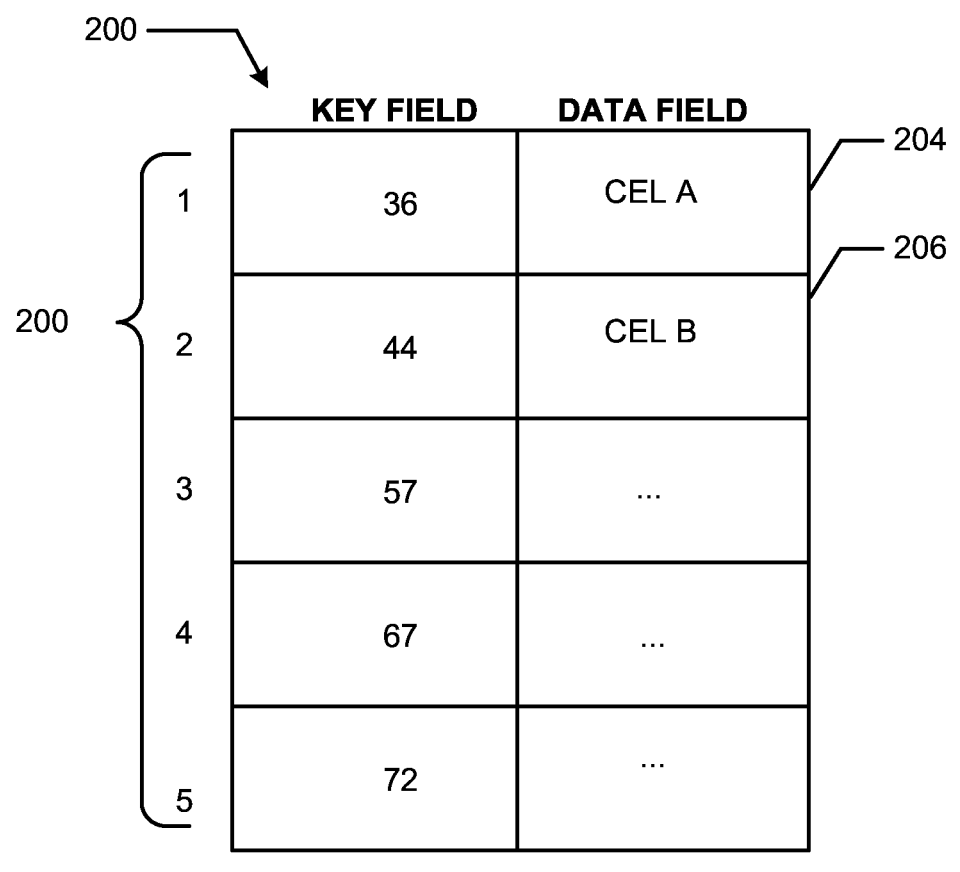

FIG. 2A is an example illustration of a hash table 200 including multiple records 202. As illustrated, each record 202 (e.g., 1, 2, 3, 4, and 5) in the hash table 200 includes a key field and an associated data field. The hash table 200 may be used to indicate whether a block of data has been stored in the L1 cache 110, the L2 cache 121, etc. For example, referring to the data block "A" example, reference "36" may be looked up in the hash table 200 indicating that a reference to block "A" was kept at a particular cache entry location ("CEL") A 204 within the MRU 114 or the MFU 116. As another example, reference 44 may be looked up in the hash table 200 indicating that a reference to a block of data was kept in was kept at a particular CEL B 206 within the MRU 114 or the MFU 116.

As illustrated in FIG. 2B, the various records within the hash table 200 may be updated or annotated to indicate that a block of data may be stored in the L2 cache 121. For example, reference 57 may be looked up in the hash table 200 indicating that a block of data was kept at a particular CEL C 208 within the L1 cache 110 (e.g. in the MRU 114, MFU 116, GL 118 or GL 120), and further, that the block of data is also being kept in the L2 cache 121 at a particular L2-CEL1 210. Additionally, the entry corresponding to reference 67 may be looked up in the hash table 200 indicating that a block of data was kept at a particular CEL D 212 within the L1 cache 110 (e.g. in the MRU 114, MFU 116, GL 118 or GL 120) and further, that the block of data is also being kept at a particular L2-CEL2 214 in the L2 cache 121.

Figure 3A:
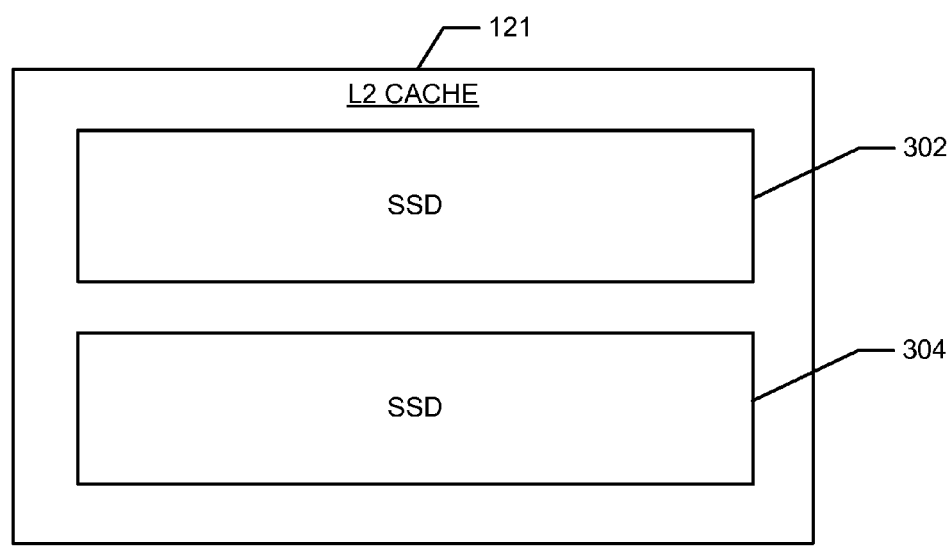
FIG. 3A-3C are block diagrams of an L2 cache in accordance with one aspect of the present disclosure.

Referring again to FIG. 1, the L1 cache 110 may be in operable communication with the L2 cache 121. The L2 cache 121 represents a secondary cache that obtains data evicted or otherwise removed from the L1 cache 110. FIG. 3A illustrates one possible example of the L2 cache in the form of one or more solid-state drives (302 and 304). A solid-state drive ("SSD") represents a type of storage device that uses semiconductor technology (e.g., integrated circuit assemblies) as memory to store data persistently. Typically, SSDs use an I/O interface developed for conventional disk storages, such as hard disk drives. Thus, SSDs can be easily integrated with existing computing environments, existing applications, file systems, or the like. In some instances, SSD drives function in accordance with SCSI protocols.

Each SSD may be any size. For example, each SSD may be 1.5 TBs (terabytes), resulting in an L2 cache capable of storing 3 TBs of data evicted from the L1 cache 110. Referring to the example block "A" above, when block "A" is added to the MFU 116, data must be evicted from the MFU 116. A reference to the data evicted from the MFU 116 is obtained by the GL 120, and the evicted data may be added to or otherwise stored in one of the SSDs 302 or 304 of the L2 cache 121. For example, if a 1 MB (megabyte) data block "B1" were evicted from the MFU 116, as a result of block "A" being added to the MFU 116, the GL 120 will store a reference corresponding to the evicted "B1". Additionally, the L2 cache 121 may received and store data block "B1" and may receive and store metadata and/or a reference to corresponding to block "B1". The L2 cache 121 may access and/or deliver data at a rate slower than the L1 cache 110, but faster than accessing data from the disk 122. Referring to block "B1", the L1 cache 110 may require 1 millisecond to access and/or deliver "B1" and the L2 cache 121 may require 5 milliseconds to access and/or deliver "B1", both of which are faster than accessing "B1" from the disk 122, which may take 50 milliseconds. Thus, in general, the L1 cache 110 may have a lower latency than the L2 cache 121, and the L2 cache 121 may have a lower latency than the disk 122.

Figure 3B:
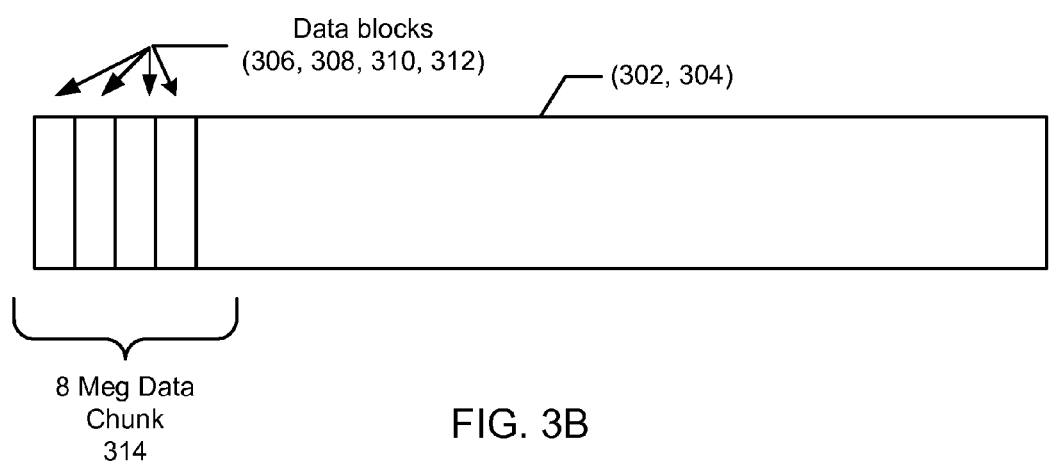

FIG. 3B represents a more detailed view of the SSDs (302 and 304). Each SSD may be divided into multiple segments or data chunks 314, such as for example, 8 MB segments. Each segment or data chunk 314 may be divided into or otherwise include a header section and a data section. The header section contains metadata describing the specific data included in the data section. For example, the metadata may include: a 'magic' number; a GUID pool id; a timestamp; a version number; and a count of the number of data blocks within the data section. Additionally, the metadata may include a list of entries, one per data block, which contains the unique ID of the block, as well as the size information and an offset into the cache device.

The magic number represents a random 64-bit value that may be use to verify header information. For example, in the context of a ZFS file system, the magic number may be hardcoded and used to identify empty data chunks. Specifically, if the number hardcoded in the ZFS system does not match the value in the header of the segment or data chunk, then the segment or data chunk is considered corrupt, or unwritten, and therefore, empty. The "GUID" is the GUID of the pool in which the data chunk is stored. For example, the GUID may be used to identify storage pool 123. The timestamp is used to determine how long ago a segment or data chunk was written. The timestamp is used to determine how long ago a segment or data chunk was written. In particular, the timestamp may be used to determine the segment or data chunk's initial eviction order. If the timestamps indicates that the segment/data chunk is older, then the data contained within the segment/data chunk is considered to be more useful and important. The version number is used to determine the format of the data in the segment. The "count of the number of data blocks" determines how many "entries"—one per data block—may be discovered in the segment or data chunk.

Figure 3C:
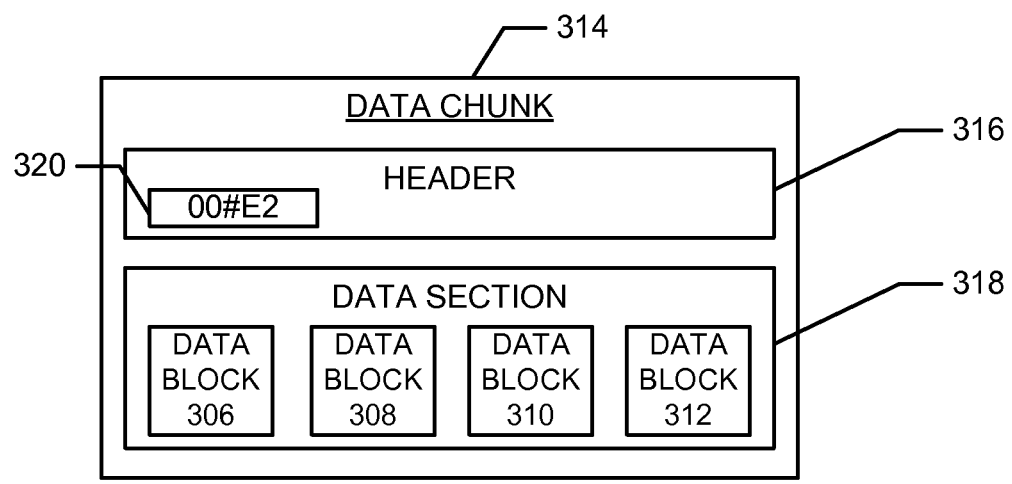
Figure 4:
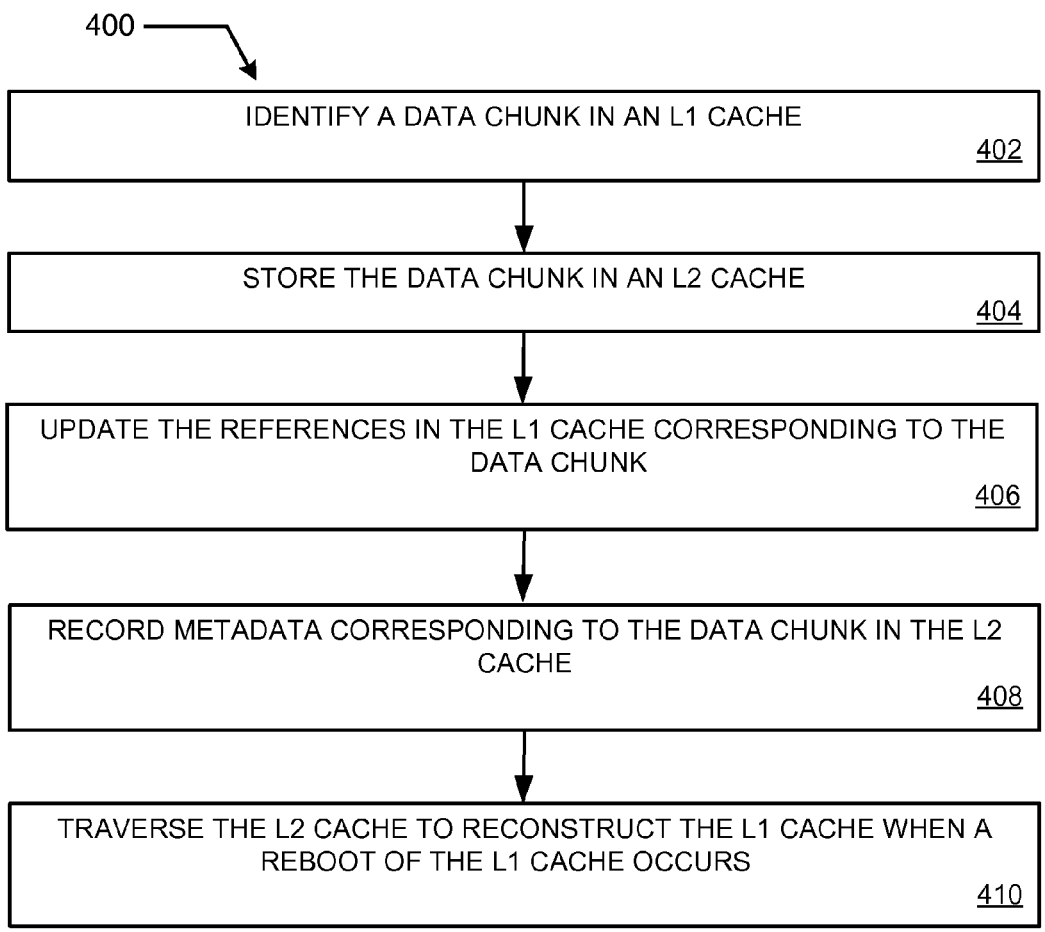
FIG. 4 is an example process for managing a cache in accordance with one aspect of the present disclosure.

FIG. 3C is an example illustration of the data chunk 314. As illustrated, data chunk 314 includes a header section 316 that includes, for example, metadata uniquely identifying each data block (306, 308, 310, and 312) and an offset location indicating where the data block is located in the L2 cache 121. The header section may be traversed, analyzed, and or processed to reconstruct the L1 cache 110 hash tables in the event that the L1 cache 110 is lost due to, for example a reboot. For example, the header of a data chunk 314 may be processed to access an identifier 320 that uniquely identifies data block 306 contained within the data chunk 314. Subsequently, an entry identifying data block 306 and the block's location within the L2 cache 121 may be added as entry 216 of the hash table 200 shown in FIG. 2B of the L1 cache 110, indicating that data block 306 is currently stored in the L2 cache 121 at that particular location.

The data section 318 stores individual data blocks (306, 308, 310, 312), and in one embodiment, may store the data blocks in a manner identical to how the data blocks were stored in main memory, such as disk 122. The L2 cache 121 may be traversed using a purely cyclic traversal methodology. Thus, the first data chunk/segment entered into the L2 cache 121 will be the first data chunk and/or segment evicted or otherwise removed from the L2 cache 121.

The L2 cache 121 may execute a thread and/or process that periodically scans the L1 cache, and in particular the eviction list 119 of the L1 cache 110, to identify data blocks that may be a candidate for transfer from the L1 cache 110 to the L2 cache 121. The data blocks may be selected from the L1 cache 110 in the form of one or more data chunks and subsequently added to the L2 MRU list 207 of the L2 cache 121.

Referring now to FIGS. 1-4, in one particular embodiment, the processing device 102 may launch, run, execute, interpret, or otherwise perform various logical instructions of the operating system 106, the file system 108, and/or the cache 110, such as process 400, which depicts an example method for providing a persistent L2 cache. Process 400 begins with identifying a data chunk in the L1 cache to be added to the L2 cache (operation 402). More specifically, the operation may begin with identifying a data chunk including various data blocks that are currently being evicted and/or scheduled to be evicted from the L1 cache. For example, if five different data blocks "1, 2, 3, 4 and 5" were contained in the eviction list of the L1 cache 110, a data chunk "C" may be identified that includes individual data blocks 1, 2, and 3.

The data chunk may be identified from the GLs of the L1 cache according to a particular size. Obtaining data in larger chunks increases the efficiency of data access on SSDs 302 and 304. Obtaining data in larger chunks means that larger writes will be performed causing in fewer input/output operations per second. As a result, data may be written more quickly, saving bandwidth for performing read operations. For example, data within the GL 118 and/or the GL 120 may be identified in 5 megabyte chunks, 8 megabyte chunks, or any other repeatable sized data chunk. Referring to data chunk "C," the size of C may be 8 megabytes. Thus, data chunk C may be an 8 megabyte data chunk including individual blocks 1, 2, and 3. In response to a data chunk being identified in the L1 cache, the data chunk may be stored in SSD 302 or SSD 304 (operation 404).

Once a particular data chunk has been stored in the L2 cache, the various references in the L1 cache corresponding to the individual blocks of data block are updated (operation 406). In particular, the entries corresponding to the individual data blocks in the MRU 114 and/or the MFU 116 may be annotated to indicate that the blocks are currently being stored in the L2 cache 121. For example, assume a standard data chunk "C" included five different data blocks "1, 2, 3, 4 and 5" referenced within the GL 118 of the MRU 114. Each entry corresponding to data blocks 1, 2, 3, 4, and 5 in the GL 118 may be annotated to indicate that the blocks have been stored in the L2 cache 121.

Once a particular data chunk has been stored in the L2 cache, metadata corresponding to the data chunk is recorded identifying each individual block within the chunk (operation 408). In particular, metadata describing the various individual data blocks included in the data chunk may be stored in the header of the data chunk. For example, assume a data chunk "C" included five different individual data blocks "1, 2, 3, 4 and 5." The header of chunk "C" may include metadata uniquely identifying each specific data block 1, 2, 3, 4, and 5 that was stored. Alternatively, the metadata may be stored in a storage pool, such as storage pool 123. As another example, the metadata may be stored in the L1 cache 110 and copied to the L2 cache 121 when a particular data bock is written.

When a reboot, failure, etc., of L1 cache occurs, the L2 cache may be traversed to reconstruct the L1 cache (operation 410). In particular, the headers of the various data chunks stored within the L2 cache may be analyzed, read, processed, etc., to identify each individual data block within each data chunk. Subsequently, a hash table entry may be re-entered into the hash table of the L1 cache (e.g. hash 200) for each data block that uniquely identifies the data block and a corresponding entry within the L1 cache pointing to the actual location of the data block in the L2 cache 121.

For example, referring to data chunk "C", if a reboot of the L1 cache 120 occurred, the header of chunk "C" may be accessed to analyze metadata identifying individual blocks of data 1, 2, 3, 4 and 5. The metadata may also include information describing GL 118 in the L1 cache 110 from which blocks 1, 2, 3, 4, and 5 were evicted. Accordingly, hash entries, one for each data block 1, 2, 3, 4, and 5 within data chunk C may be added to the hash table corresponding to the L1 cache 121 that identify specific references in the GL 118. The identified references in the GL 118 point to where the actual blocks of data are stored in the L2 cache 121.

Figure 5:
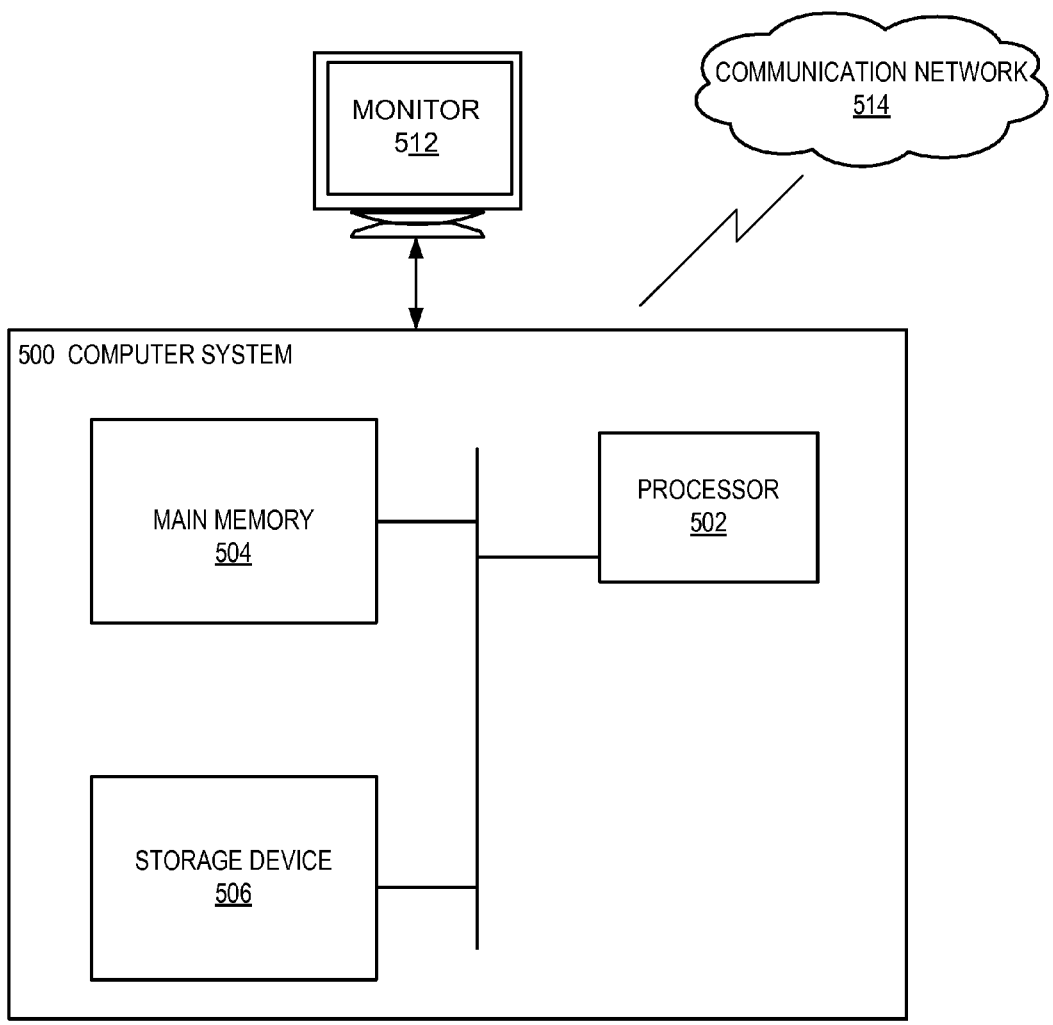
FIG. 5 is an example computing system in accordance with one aspect of the present disclosure.

The various inventive concepts described above may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer 500 may also include input means, such as a keyboard and a mouse and output means, such as a monitor 512. The computer system 500 may be connected to a local area network (LAN) or a Wide area network (e.g., the Internet), such as communication network 514, via a network interface connection (not shown). Those skilled in the art will appreciate that these input and output means may take other forms.

Further, those skilled in the art will appreciate that one or more elements of the computer system 500 may be located at a remote location and connected to the other elements over a network. The invention may be implemented on a distributed system having a plurality of nodes, where each portion of the invention (e.g., the operating system, file system, cache, application(s), etc.) may be located on a different node within the distributed system, and each node may correspond to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, a digital versatile disk (DVD), or any other suitable tangible computer readable storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A processor-based method for maintaining a cache, the method comprising:

evicting a data block from a level-one cache to a level-two cache, wherein the level-one cache comprises a volatile memory type, and wherein the level-two cache comprises a persistent memory type;

adding a first data block pointer into a ghost list in the level-one cache at a location identified by a ghost list index associated with the ghost list, wherein the first data block pointer references a location in the level-two cache where the data block is stored; and adding, into a hash table:

a hash entry, at a location identified by a hash table index associated with the hash table, that includes:
an identifier of the data block; and
the ghost list index;

adding to a header in a data chunk in level-two cache;

a second data block pointer, wherein the second data block pointer references a location in the data chunk where the data block is stored;

the hash table index; and the hash entry; and detecting a loss of data in the level-one cache that includes an emptying of the level-one cache;

responding to the detecting a loss of data in the level-one cache by:

analyzing the header of the data chunk in the level-two cache to determine for the data block:
the hash entry;
the second data block pointer; and
the hash table index; and repopulating the hash entry into the hash table at the location in the hash table identified by the hash table index;

generating the first data block pointer from the second data block pointer; and repopulating the first data block pointer into the ghost list at the location in the ghost list identified by the ghost list index.

2. The processor-based method of claim 1, wherein the data chunk further comprises a data section storing the data block and a header section storing the header and the header further comprises a magic number, and wherein analyzing the header includes analyzing the magic number to determine the data chunk is corrupted.

3. The processor-based method of claim 1, wherein the level-one cache is an adaptive replacement cache.

4. The processor-based method of claim 1, wherein the level-one cache and the level-two cache are part of a ZFS, wherein the level-one cache comprises dynamic random access memory and the level-two cache comprises one or more solid state drives.

5. The processor-based method of claim 4, wherein the level-one cache is an adaptive replacement cache.

6. A processor-based system for maintaining a cache, the processor-based system comprising:
    a level-two cache, wherein the level-two cache comprises a persistent memory type;
    a level-one cache, wherein the level-one cache comprises a volatile memory type, comprising:
        a ghost list comprising:
            a ghost list index associated with the ghost list; and
            a first data block pointer stored at a location identified by the ghost list index, wherein the first data block pointer references a location in the level-two cache where a data block is stored; and
        a hash table comprising:
            a hash table index associated with the hash table,
            a hash entry, at the location identified by the hash table index, that includes:
                an identifier of the data block, wherein the data block was evicted from the level-one cache to the level-two cache; and
                the ghost list index;
    a data chunk, located in the level-two cache, comprising:
        the data block; and
        a header comprising:
            a second data block pointer, wherein the second data block pointer references a location of the data block in the data chunk;
            the identifier of the data block;
            the hash table index; and
            the hash entry;
    at least one processor to:
        detect a loss of data in the level-one cache that includes an emptying of the level-one cache;
        in response to the detecting the loss of data in the level-one cache:
            analyze the header of the data chunk in the level-two cache to determine for the data block:
                the second data block pointer;
                the hash table index; and
                the hash entry; and
            repopulate the hash entry into the hash table at the location identified by the hash table index;
            generate the first data block pointer from the second data block pointer; and
            repopulate the first data block pointer into the ghost list at the location identified by the ghost list index.

7. The processor-based system of claim 6, wherein the data chunk further comprises a data section storing the data block and a header section storing the header and the header further comprises a magic number, and wherein analyzing the header includes analyzing the magic number to determine the data chunk is corrupted.

8. The processor-based system of claim 6, wherein the level-one cache is an adaptive replacement cache.

9. The processor-based system of claim 6, wherein the level-on cache and the level-two cache are part of a ZFS, wherein the level-one cache comprises dynamic random access memory and the level-two cache comprises one or more solid state drives.

10. A non-transitory computer readable medium encoded with instructions for maintaining a cache executable by a processor, the instructions comprising:
    evicting a data block from a level-one cache to a level-two cache, wherein the level-one cache comprises a volatile memory type, and wherein the level-two cache comprises a persistent memory type;
    adding a first data block pointer into a ghost list in the level-one cache at a location identified by a ghost list index associated with the ghost list, wherein the first data block pointer references a location in the level-two cache where the data block is stored; and
    adding, into a hash table:
        a hash entry, at a location identified by a hash table index associated with the hash table, that includes:
            an identifier of the data block; and
            the ghost list index;
    adding to a header in a data chunk in level-two cache;
        a second data block pointer, wherein the second data block pointer references a location in the data chunk where the data block is stored;
        the hash table index; and
        the hash entry; and
    detecting a loss of data in the level-one cache that includes an emptying of the level-one cache;
    responding to the detecting a loss of data in the level-one cache by:
        analyzing the header of the data chunk in the level-two cache to determine for the data block:
            the hash entry;
            the second data block pointer; and
            the hash table index; and
        repopulating the hash entry into the hash table at the location in the hash entry identified by the hash table index;
        generating the first data block pointer from the second data block pointer; and
        repopulating the first data block pointer into the ghost list at the location in the ghost list identified by the ghost list index.

11. The non-transitory computer readable medium of claim 10, wherein the data chunk further comprises a data section storing the data block and a header section storing the header and the header further comprises a magic number, and wherein analyzing the header includes analyzing the magic number to determine the data chunk is corrupted.

12. The non-transitory computer readable medium of claim 10, wherein the level-one cache is an adaptive replacement cache.

13. The non-transitory computer readable medium of claim 10, wherein the level-on cache and the level-two cache are part of a ZFS, wherein the level-one cache comprises dynamic random access memory and the level-two cache comprises one or more solid state drives.

14. The non-transitory computer readable medium of claim 13, wherein the level-one cache is an adaptive replacement cache.

15. The processor-based system of claim 9, wherein the level-one cache is an adaptive replacement cache.

* * * * *

UNITED STATES PATENT AND TRADEMARK OFFICE
CERTIFICATE OF CORRECTION

PATENT NO. : 9,772,949 B2
APPLICATION NO. : 13/655195
DATED : September 26, 2017
INVENTOR(S) : Maybee et al.

Page 1 of 1

It is certified that error appears in the above-identified patent and that said Letters Patent is hereby corrected as shown below:

On the Title Page

Column 2, under Abstract, Line 1, delete "level two" and insert -- level-two --, therefor.

On page 2, Column 1, under Other Publications, Line 3, delete "2009 ," and insert -- 2009, --, therefor.

In the Specification

In Column 1, Line 19, delete "from" and insert -- form --, therefor.

In Column 7, Line 45, delete "and or" and insert -- and/or --, therefor.

In the Claims

In Column 10, Line 50, in Claim 1, delete "cache;" and insert -- cache: --, therefor.

In Column 12, Line 10, in Claim 9, delete "level-on" and insert -- level-one --, therefor.

In Column 12, Line 31, in Claim 10, delete "cache;" and insert -- cache: --, therefor.

In Column 12, Line 64, in Claim 13, delete "level-on" and insert -- level-one --, therefor.

Signed and Sealed this
Nineteenth Day of June, 2018

Andrei Iancu
*Director of the United States Patent and Trademark Office*